(12) United States Patent
Xu

(10) Patent No.: US 11,922,583 B2
(45) Date of Patent: Mar. 5, 2024

(54) INTERACTIVE METHOD AND SYSTEM OF MOVABLE PLATFORM, MOVABLE PLATFORM, AND STORAGE MEDIUM

(71) Applicant: SZ DJI TECHNOLOGY CO., LTD., Shenzhen (CN)

(72) Inventor: Bin Xu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 129 days.

(21) Appl. No.: 17/398,029

(22) Filed: Aug. 10, 2021

(65) Prior Publication Data

US 2021/0366202 A1    Nov. 25, 2021

Related U.S. Application Data

(63) Continuation of application No. PCT/CN2019/092989, filed on Jun. 26, 2019.

(51) Int. Cl.
*G06T 19/00* (2011.01)
*B60R 1/28* (2022.01)
(Continued)

(52) U.S. Cl.
CPC .............. *G06T 19/006* (2013.01); *B60R 1/28* (2022.01); *G06V 20/58* (2022.01);
(Continued)

(58) Field of Classification Search
None
See application file for complete search history.

(56) References Cited

U.S. PATENT DOCUMENTS 9,098,754 B1    8/2015  Stout et al.
2005/0163343 A1*  7/2005  Kakinami ............ G06V 20/586
382/103

(Continued)

FOREIGN PATENT DOCUMENTS

CN    102303605 A    1/2012
CN    107194962 A    9/2017
(Continued)

OTHER PUBLICATIONS

Daniel Spalding, "Tesla Model 3 Updated Visualizations", May 16, 2019, URL: https://www.youtube.com/watch?v=jQioNtg4oq4&t=10s (Year: 2019).*

(Continued)

*Primary Examiner* — David H Chu
(74) *Attorney, Agent, or Firm* — XSENSUS LLP

(57) ABSTRACT

An interactive method for a movable platform, an interactive system, a movable platform and a storage medium including the interactive method. The interactive method may include projecting three-dimensional point cloud data collected by a sensor into image data collected by a camera for fusion processing to obtain a fused image; rendering the fused image to determine a three-dimensional visualization image of a surrounding environment where the movable platform is located; and outputting the three-dimensional visualization image of the surrounding environment where the movable platform is located on a display interface.

18 Claims, 7 Drawing Sheets

Project three-dimensional point cloud data collected by a sensor into image data collected at the same time by a camera for fusion processing to obtain a fused image — S301

Render the fused image to determine a three-dimensional visualization image of a surrounding environment where a movable platform is located — S302

Output the three-dimensional visualization image of the surrounding environment where the movable platform is located on a display interface — S303

(51) Int. Cl.
  *G06V 20/58* (2022.01)
  *G06F 3/04817* (2022.01)
  *G06F 3/0488* (2022.01)

(52) U.S. Cl.
  CPC ... *B60R 2300/301* (2013.01); *B60R 2300/802* (2013.01); *G06F 3/04817* (2013.01); *G06F 3/0488* (2013.01); *G06T 2207/30261* (2013.01); *G06T 2210/56* (2013.01)

(56) References Cited

U.S. PATENT DOCUMENTS

| | | | | |
|---|---|---|---|---|
| 2006/0202984 | A1* | 9/2006 | Yang | G06T 3/4038 345/419 |
| 2009/0306881 | A1* | 12/2009 | Dolgov | G06F 18/295 701/28 |
| 2010/0020176 | A1* | 1/2010 | Higashibara | B60R 1/00 348/148 |
| 2010/0295945 | A1* | 11/2010 | Plemons | B60R 1/00 348/148 |
| 2012/0218125 | A1* | 8/2012 | Demirdjian | G08G 1/164 340/905 |
| 2015/0195398 | A1* | 7/2015 | Schimpff | G08G 1/164 455/556.1 |
| 2016/0159280 | A1 | 6/2016 | Takazawa et al. | |
| 2017/0111587 | A1* | 4/2017 | Herbst | B60R 1/12 |
| 2017/0313324 | A1* | 11/2017 | Kumai | B60W 40/02 |
| 2019/0025854 | A1* | 1/2019 | Rohani | G01C 21/005 |
| 2020/0254931 | A1* | 8/2020 | Herman | H04N 5/2624 |

FOREIGN PATENT DOCUMENTS

| | | |
|---|---|---|
| CN | 107966700 A | 4/2018 |
| CN | 107972585 A | 5/2018 |
| CN | 109085598 A | 12/2018 |
| CN | 109683170 A | 4/2019 |
| CN | 109767452 A | 5/2019 |
| KR | 10-2018-0066618 A | 6/2018 |

OTHER PUBLICATIONS

International Search Report and Written Opinion dated Mar. 27, 2020, received for PCT Application PCT/CN2019/092989, filed on Jun. 26, 2019, 11 pages including English Translation.

* cited by examiner

INTERACTIVE METHOD AND SYSTEM OF MOVABLE PLATFORM, MOVABLE PLATFORM, AND STORAGE MEDIUM

CROSS-REFERENCE TO RELATED APPLICATION

The present application is a continuation of International Application No. PCT/CN2019/092989, filed Jun. 26, 2019, the entire contents of which being incorporated herein by reference in its entirety.

TECHNICAL FIELD

The present disclosure relates to the field of control, and in particular to an interactive method and system of a movable platform, a movable platform and a storage medium.

BACKGROUND

Currently, the display/interaction mode of electronic sensor systems on movable platforms such as automobiles is still relatively simple. For example, for a reversing radar system (ultrasonic system), an approximate distance is usually given to a driver by sound. The closer to an obstacle, the louder the sound will be to increase the warning effect. For a central control system, it usually provides navigation and entertainment functions, as well as a reversing image function, otherwise, the driver obtains less information from the central control system. For a dashboard display system, it usually provides information about the operation status of some auto parts, such as prompting the driver that the door is in an open/close state, etc. Although the existing electronic dashboard may provide more and richer information, it is basically still just integrating the original central control display information into a dashboard. For example, it provides navigation functions in the dashboard without more display or interactive functions.

With the development of automobile-assisted driving technology and autonomous driving technology, the perception ability of an automobile to its surrounding environment is becoming stronger and stronger. The traditional display/interaction methods of sensor system have been difficult to display more information obtained by the current sensor system. Therefore, it is of great significance to provide a better display/interaction method coordinated with the sensor system to improve driving safety and user experience.

SUMMARY

The present disclosure is directed to an interactive method and system of a movable platform, a movable platform, and a storage medium. A three-dimensional visualization image of the surrounding environment of a movable platform may be displayed through a display interface, thereby improving the user experience.

A first aspect of the present disclosure provides an interactive method of a movable platform. The interactive method is used for a movable platform having an interactive system, and a display interface is provided on the interactive system. The interactive method may include:
  projecting three-dimensional point cloud data collected by a sensor into image data collected by a camera for fusion processing to obtain a fused image;
  rendering the fused image to determine a three-dimensional visualization image of a surrounding environment where the movable platform is located; and
  outputting the three-dimensional visualization image of the surrounding environment where the movable platform is located on the display interface.

A second aspect of the present disclosure provides an interactive system. The interactive system provided with a display interface is used for a movable platform. The interactive system may include one or more processors, collectively or individually, configured to:
  project three-dimensional point cloud data collected by a sensor into image data collected by a camera for fusion processing to obtain a fused image;
  render the fused image to determine a three-dimensional visualization image of a surrounding environment where the movable platform is located; and
  output the three-dimensional visualization image of the surrounding environment of where the movable platform is located on the display interface.

A third aspect of the present disclosure provides a movable platform. The movable platform may include a body; a power system disposed on the body for providing mobile power to the movable platform; and a processor configured to:
  project three-dimensional point cloud data collected by a sensor into image data collected by a camera for fusion processing to obtain a fused image;
  render the fused image to determine a three-dimensional visualization image of a surrounding environment where the movable platform is located; and
  output the three-dimensional visualization image of the surrounding environment where the movable platform is located on a display interface.

A fourth aspect of the present disclosure provides a computer-readable storage medium having stored a computer program thereon that, when executed by a processor, implements the interactive method described above.

In some embodiments of the present disclosure, the interactive system may project three-dimensional point cloud data collected by a sensor into image data collected by a camera for fusion processing to obtain a fused image, render the fused image to determine a three-dimensional visualization image of a surrounding environment where a movable platform is located, and then output the three-dimensional visualization image of the surrounding environment where the movable platform is located on a display interface. Accordingly, user experience is improved.

BRIEF DESCRIPTION OF THE DRAWINGS

In order to explain the technical features of embodiments of the present disclosure more clearly and fully, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
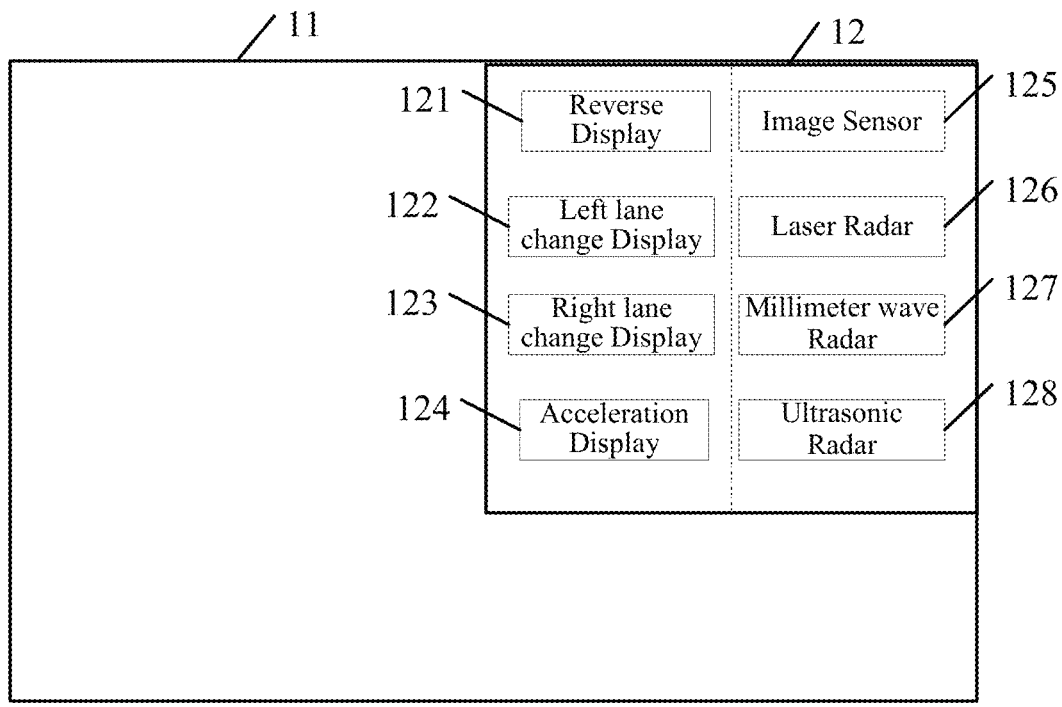
FIG. 1 illustrates a schematic diagram of a display interface of an interactive system according to some embodiments of the present disclosure.

The technical solutions and technical features encompassed in the exemplary embodiments of the present disclosure will be described in detail in conjunction with the accompanying drawings in the exemplary embodiments of the present disclosure. Apparently, the described exemplary embodiments are part of embodiments of the present disclosure, not all of the embodiments. Based on the embodiments and examples disclosed in the present disclosure, all other embodiments obtained by those of ordinary skill in the art without inventive efforts shall fall within the protection scope of the present disclosure.

Here, exemplary embodiments will be described in detail, and examples thereof are shown in the accompanying drawings. The implementation manners described in the following exemplary embodiments do not represent all implementation manners consistent with the present disclosure. On the contrary, they are only examples of devices, systems and methods consistent with some aspects of the disclosure as detailed in the appended claims. Further, the chart(s) and diagram(s) shown in the drawings are only examples, and does not necessarily include all components, elements, contents and/or operations/steps, nor does it have to be arranged in the described or specific order. For example, some components/elements can also be disassembled, combined or partially combined; therefore, the actual arrangement may be changed or modified according to actual conditions. In the case of no conflict, the components, elements, operations/steps and other features disclosed in the embodiments may be recombined with one another.

With the development of automobile-assisted driving technology and autonomous driving technology, the perception ability of an automobile to its surrounding environment is becoming stronger and stronger. The traditional display/interaction methods of sensor system have been difficult to display more information obtained by the current sensor system. Therefore, it is of great significance to provide a better display/interaction method coordinated with the sensor system to improve driving safety and user experience.

The interactive method of a movable platform provided in some embodiments of the present disclosure may be carried out by an interactive system, which may include a movable platform and an interactive device. In some embodiments, the interactive device may be provided on the movable platform. In some embodiments, the interactive device may be independent of the movable platform. For example, the interactive device may be provided on a terminal such as a mobile phone, a tablet computer, a smart watch or the like, that establishes a communication connection with the movable platform. In one embodiment, the interactive device may also be provided in a cloud processor. In other embodiments, the interactive device may be applied to other equipment such as unmanned vehicles, unmanned aerial vehicles, robots, unmanned ships, etc.

According to some embodiments of the present disclosure, a complete and simple three-dimensional display interface for observing a surrounding environment of a movable platform is constructed for different motion scenarios. As such, a driver of the movable platform may quickly understand the surrounding environment, a driver's blind area is eliminated, and a time for the driver switching to view different sensors on a traditional automobile is not needed, thereby improving driving safety and driving experience.

In some embodiments of the present disclosure, the interactive device may project three-dimensional point cloud data collected by a sensor into image data collected by a camera for fusion processing to obtain a fused image, and render the fused image to determine a three-dimensional visualization image of a surrounding environment where a movable platform is located, so as to output the three-dimensional visualization image of the surrounding environment of the movable platform on a display interface. Specifically, the interactive device may project three-dimensional point cloud data collected by the sensor into image data collected at the same time by the camera for fusion processing. In this way, when a user obtains the three-dimensional visualization image on the display interface, the user simultaneously obtains three-dimensional point cloud information and/or image information of the surrounding environment where the movable platform is located.

In some embodiments of the present disclosure, the interactive device may be disposed at any position in the movable platform that facilitates user operation. By arranging the interactive device at a position in the movable platform that facilitates user operation, a driver or passenger may conveniently view the content information displayed on a display interface of the interactive device, which facilitates the control of a display angle of the three-dimensional visualization image through the interactive device.

In some embodiments of the present disclosure, one or more sensors may be provided on the movable platform for collecting point cloud data of the surrounding environment of the movable platform. In some embodiments, the movable platform may include a camera or the like for capturing image data of the surrounding environment of the movable platform.

FIG. 1 illustrates a schematic diagram of a display interface of an interactive system according to some embodiments of the present disclosure. As shown in FIG. 1, the display interface of the interactive system may include a display area 11 and a touch control area 12. In some embodiments, the display area 11 is used to display a three-dimensional visualization image of the surrounding environment of the movable platform. In some embodiments, the touch control area 12 may include a plurality of angle display icons and a plurality of sensor type icons. The plurality of angle display icons may include a reverse display icon 121, a left lane change display icon 122, a right lane change display icon 123, an acceleration display icon 124, etc., and are used to indicate a viewing angle of displaying a three-dimensional visualization image. The plurality of sensor type icons may include icons representing an image sensor 125, a laser radar 126, a millimeter wave radar 127, an ultrasonic radar 128, etc., and are used for a user to select the type of sensor for collecting point cloud data.

Therefore, the viewing angle of the three-dimensional visualization image displayed on the display interface may be determined based on a motion state of the movable platform, thereby improving safety in a moving process of the movable platform.

Figure 2:
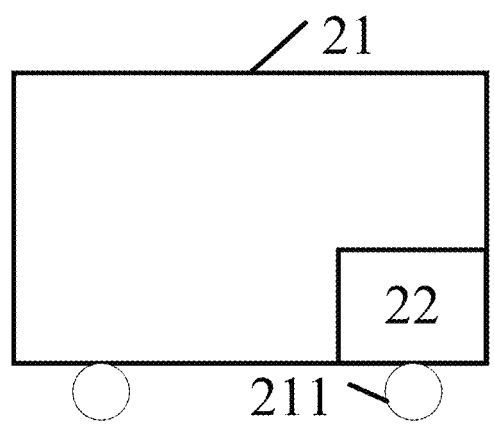
FIG. 2 illustrates a schematic structural diagram of an interactive system according to some embodiments of the present disclosure.

FIG. 2 illustrates a schematic structural diagram of an interactive system according to some embodiments of the present disclosure. As shown in FIG. 2, the interactive system may include: a movable platform 21 and an interactive device 22. The movable platform 21 is provided with the interactive device 22. The movable platform 21 may further include a power system 211 configured to provide power for the movable platform 21 to operate.

In some embodiments of the present disclosure, the interactive device 22 is disposed in the movable platform 21, and the interactive device 22 provided with a display interface is connected to the movable platform 21. The display interface of the interactive device 22 includes a display area and a touch control area. The display area is used to display a three-dimensional visualization image of a surrounding environment of the movable platform 21. The touch control area may include a plurality of angle display icons and a plurality of sensor type icons. The interactive device 22 may acquire three-dimensional point cloud data collected by a sensor selected by a user based on at least one of the plurality of sensor type icons selected by the user in the touch control area. The interactive device may acquire image data collected by a camera. The interactive system 22 performs fusion processing by projecting the three-dimensional point cloud data into the image data to obtain a fused image, renders the fused image to obtain a three-dimensional visualization image of a surrounding environment where the movable platform is located, and outputs the three-dimensional visualization image of the surrounding environment of the movable platform in the display area of the display interface.

Figure 3:
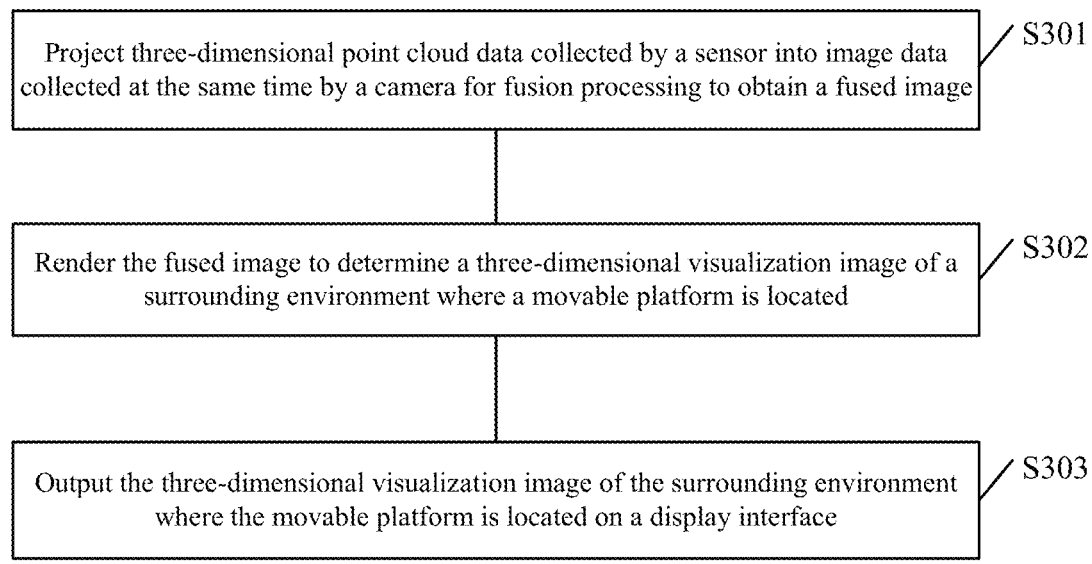
FIG. 3 illustrates a schematic flowchart of an interactive method of a movable platform according to some embodiments of the present disclosure.

FIG. 3 illustrates a schematic flowchart of an interactive method of a movable platform according to some embodiments of the present disclosure. The interactive method may be carried out by an interactive system being provided with a display interface. And the interactive system is communicatively connected to the movable platform. In particular, the interactive method may include steps S301 to S303.

Step S301 may include projecting three-dimensional point cloud data collected by a sensor into image data collected at the same time by a camera for fusion processing to obtain a fused image.

In some embodiments of the present disclosure, the interactive system may project the three-dimensional point cloud data collected by the sensor to the image data collected by the camera for fusion processing to obtain the fused image. In certain embodiments, the sensor may include, but is not limited to, one or more of an image sensor, a laser radar, a millimeter wave radar, and an ultrasonic radar.

In some embodiments of the present disclosure, prior to projecting three-dimensional point cloud data collected by a sensor into image data collected by a camera for fusion processing, the interactive system may acquire a touch operation of a user on at least one of a plurality of sensor type icons in a touch control area of the display interface to determine a target sensor corresponding to the at least one of the plurality of sensor type icons selected by the touch operation based on the touch operation. Then, the interactive system may acquire three-dimensional point cloud data collected by the target sensor. In certain embodiments, the touch operation may include, but is not limited to, a click operation, a sliding operation, a drag operation, etc. on the sensor type icons.

Taking FIG. 1 as an example, assuming that the interactive system acquires a touch operation of a user on a laser radar 126 icon in the touch control area 12, it may determine that the laser radar 126 on the movable platform is a target sensor. Then, the interactive system acquires three-dimensional point cloud data corresponding to a surrounding environment of the movable platform collected by the laser radar 126.

Therefore, the sensor for collecting point cloud data of the surrounding environment of the movable platform may be independently selected by a user, which improves flexibility of collecting point cloud data and improves user experience.

In some embodiments of the present disclosure, prior to projecting three-dimensional point cloud data collected by a sensor into image data collected by a camera for fusion processing, if no touch operation of a user on the sensor type icons in the touch control area of the display interface is acquired, the interactive system may acquire three-dimensional point cloud data collected by a preset sensor.

In some embodiments of the present disclosure, when the interactive system projects the three-dimensional point cloud data collected by the sensor into the image data collected by the camera for fusion processing to obtain the fused image, a coordinate transformation relationship between the collected image data and the three-dimensional point cloud data may be determined. Based on the coordinate transformation relationship, point cloud data corresponding to the image data and the three-dimensional point cloud data are transformed into the same coordinate system. The three-dimensional point cloud data transformed into the same coordinate system is projected into the image data for fusion processing to obtain the fused image.

In some embodiments of the present disclosure, when the interactive system transforms point cloud data corresponding to the image data and the three-dimensional point cloud data into the same coordinate system and projects the three-dimensional point cloud data transformed into the same coordinate system into the image data for fusion processing, a coordinate transformation may be performed on the image data, and the coordinate transformed image data may be fused with the three-dimensional point cloud data. Optionally, the three-dimensional point cloud data may be subjected to the coordinate transformation, and the coordinate transformed three-dimensional point cloud data may be fused with the image data.

Therefore, through this implementation manner, the flexibility of fusion processing of three-dimensional point cloud data and image data is improved.

Step S302 may include rendering the fused image to determine a three-dimensional visualization image of a surrounding environment where the movable platform is located.

In some embodiments of the present disclosure, the interactive system may render the fused image to determine the three-dimensional visualization image of the surrounding environment where the movable platform is located.

In some embodiments of the present disclosure, when the interactive system renders the fused image to determine the three-dimensional visualization image of the surrounding environment where the movable platform is located, the interactive system may project the fused image onto a two-dimensional plane to obtain at least one projection image, determine obstacle information of the surrounding environment where the movable platform is located based on the at least one projection image, and determine the three-dimensional visualization image based on the obstacle information.

In some embodiments of the present disclosure, when the interactive system determines the three-dimensional visualization image based on the obstacle information, it may determine the three-dimensional visualization image based on positions of obstacles and distances between the obstacles and the movable platform.

In some embodiments of the present disclosure, the obstacle information may include one or more of position information, size information, and distance information of obstacles. In certain embodiments, the obstacles may include one or more of pedestrians, vehicles, animals, and plants.

Step S303 may include outputting the three-dimensional visualization image of the surrounding environment where the movable platform is located on a display interface.

In some embodiments of the present disclosure, the interactive system may output the three-dimensional visualization image of the surrounding environment where the movable platform is located on the display interface. In some embodiments, the display interface may include a display area and a touch control area, and the touch control area may include a plurality of angle display icons and a plurality of sensor type icons. In some embodiments, the display interface may be a touch display interface.

In some embodiments of the present disclosure, when the interactive system outputs the three-dimensional visualization image of the surrounding environment where the movable platform is located on the display interface, it may output the three-dimensional visualization of the surrounding environment where the movable platform is located in the display area of the display interface. Taking FIG. 1 as an example, the interactive system may output the three-dimensional visualization image of the surrounding environment where the movable platform is located in the display area 11 of the display interface.

In some embodiment of the present disclosure, when the interactive system outputs the three-dimensional visualization image of the surrounding environment where the movable platform is located in the display area of the display interface, it may obtain a touch operation of a user on at least one of the plurality of angle display icons in the touch control area, and generate an angle display instruction corresponding to the touch operation based on the touch operation, and display the three-dimensional visualization image in the display area of the display interface based on a display viewing angle indicated by the angle display instruction. In certain embodiments, the touch operation may include, but is not limited to, a click operation, a slide operation, and a drag operation on the angle display icons.

Taking FIG. 1 as an example, if the interactive system acquires a touch operation of a user on the reverse display icon 121 in the touch control area 12, an angle display instruction corresponding to the reverse display icon 121 may be generated based on the touch operation, and the three-dimensional visualization image is displayed in the display area of the display interface based on a display viewing angle indicated by the angle display instruction.

In some embodiments of the present disclosure, when the interactive system outputs the three-dimensional visualization image of the surrounding environment where the movable platform is located on the display interface, a current motion state of the movable platform may be acquired, a display viewing angle of the three-dimensional visualization image is determined based on the current motion state, and the three-dimensional visualization image is displayed in the display area of the display interface based on the determined display viewing angle.

According to exemplary embodiments described above, the interactive system may project three-dimensional point cloud data collected by a sensor into image data collected by a camera for fusion processing to obtain a fused image, render the fused image to determine a three-dimensional visualization image of a surrounding environment where the movable platform is located, and output the three-dimensional visualization image of the surrounding environment where the movable platform is located on a display interface. As such, outputting the three-dimensional visualization image of the surrounding environment of the movable platform improves user experience.

Figure 4:
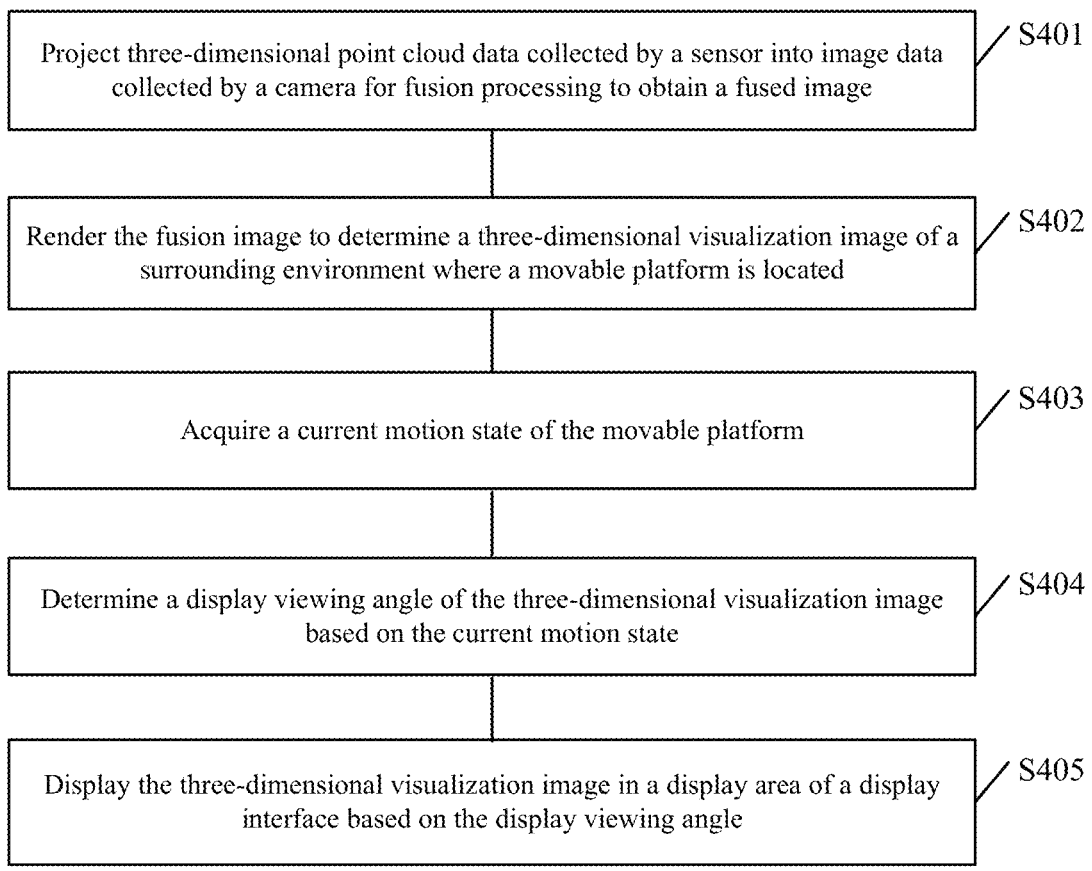
FIG. 4 illustrates a schematic flowchart of an interactive method of a movable platform according to some embodiments of the present disclosure.

FIG. 4 illustrates a schematic flowchart of an interactive method of a movable platform according to some embodiments of the present disclosure. The interactive method may be carried out by the interactive system described above. In particular, the difference between the instant interactive method shown in FIG. 4 and the interactive method shown in FIG. 3 is that the instant interactive method schematically illustrates the determination of a display viewing angle of a three-dimensional visualization image based on a motion state of the movable platform. The instant interactive method may include steps S401 to S405.

Step S401 may include projecting three-dimensional point cloud data collected by a sensor into image data collected by a camera for fusion processing to obtain a fused image.

In some embodiments of the present disclosure, the interactive system may project the three-dimensional point cloud data acquired by the sensor into the image data acquired by the camera for fusion processing to obtain the fused image.

Step S402 may include rendering the fusion image to determine a three-dimensional visualization image of a surrounding environment where the movable platform is located.

In some embodiments of the present disclosure, the interactive system may render the fusion image to determine the three-dimensional visualization image of the surrounding environment where the movable platform is located.

Step S403 may include acquiring a current motion state of the movable platform.

In some embodiments of the present disclosure, the interactive system may acquire the current motion state of the movable platform. In certain embodiments, the current motion state of the movable platform may include, but is not limited to, one or more of a reversing state, a lane changing state, a braking state, an accelerating state, and a decelerating state.

Step S404 may include determining a display viewing angle of the three-dimensional visualization image based on the current motion state.

In some embodiments of the present disclosure, the interactive system may determine the display viewing angle of the three-dimensional visualization image based on the current motion state of the movable platform.

In some embodiments, the current motion state may include a reversing state. When the interactive system determines a display viewing angle of the three-dimensional visualization image based on a current motion state, the interactive system may determine the current motion state of the movable platform. When it is determined that the movable platform is in the reversing state, it can be determined that the display viewing angle of the three-dimensional visualization image is to display a three-dimensional visualization image within a first preset area distanced from the movable platform.

In one embodiment, the interactive system may detect that there is an obstacle in the first preset area distanced from the movable platform in the displayed three-dimensional visualization image when the movable platform is in the reversing state. The obstacle in the three-dimensional visualization image and a distance between the obstacle and the movable platform are displayed.

In one embodiment, when the interactive system determines whether the movable platform is in a reversing state, it may determine that the movable platform is in the reversing state based on an acquired touch operation of a user on a reverse display icon among angle display icons in a touch control area of a display interface.

In other embodiments, the interactive system may determine whether the movable platform is in a reversing state based on acquired reverse gear information, tire rotation direction information, etc. In this regard, the way to determine whether the movable platform is in a reversing state is not specifically limited.

Figure 5:
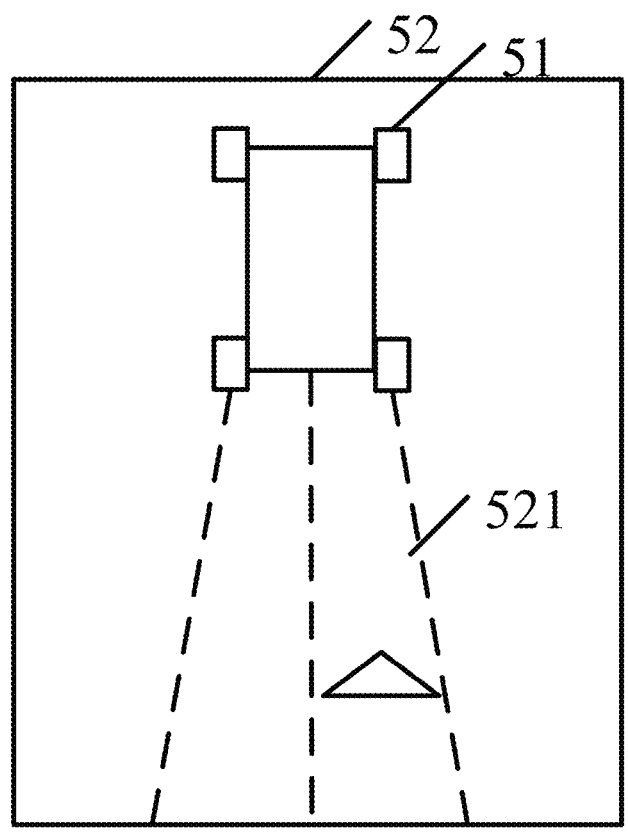
FIG. 5 illustrates a display interface of a three-dimensional visualization image when a movable platform is in a reversing state according to some embodiments of the present disclosure.

FIG. 5 is taken as an example to illustrate a display viewing angle when the movable platform is in a reversing state. FIG. 5 illustrates a display interface of a three-dimensional visualization image when the movable platform is in a reversing state according to some embodiments of the present disclosure. As shown in FIG. 5, the movable platform is a vehicle 51, and the display viewing angle of the three-dimensional visualization image is to display a first preset area 52 of the movable platform distanced from the rear of the vehicle 51. An obstacle 521 is detected in the first preset area 52 and the distance between the obstacle 521 and the rear of the vehicle 51 is, for example, 1 meter.

Therefore, by displaying the surrounding environment information in the first preset area distanced from the rear of the movable platform, including the obstacle in the first preset area and the distance between the obstacle and the rear of the movable platform when the movable platform is in the reversing state, a user may be reminded of the position of the obstacle and the position from the rear of the movable platform to avoid colliding with the obstacle when the user is reversing the movable platform, thereby improving safety of the movable platform in the reversing state.

In some embodiments, the current motion state may include a lane changing state. When the interactive system determines a display viewing angle of the three-dimensional visualization image based on a current motion state, when it is determined that the movable platform is in the lane changing state, it can determine that the display viewing angle of the three-dimensional visualization image is to display a three-dimensional visualization image of a lane for lane-changing in a second preset area.

In some embodiments, when the interactive system determines whether the movable platform is in a lane changing state, it may determine that the movable platform is in the lane changing state based on an acquired touch operation of a user on a lane change display icon among angle display icons in a touch control area of a display interface.

In certain embodiments, the lane change display icon may include a left-lane change display icon and a right-lane change display icon. If the interactive system obtains a touch operation of a user on a left-lane change display icon in a touch control area of a display interface, then it can determine that the movable platform is in a left-lane changing state, i.e. the movable platform is changing a lane from the current driving lane to its left lane. If the interactive system obtains a touch operation of a user on a right-lane change display icon in the touch control area, it may determine that the movable platform is in a right-lane changing state, i.e. the movable platform is changing a lane from the current driving lane to its right lane.

In other embodiments, the interactive system may determine whether the movable platform is in a lane changing state based on acquired turn light information (such as turning on the left turn light or turning on the right turn light), tire rotation angle, tire rotation direction, etc. There is no specific limitation on how to determine whether the movable platform is in a lane-changing state.

Figure 6:
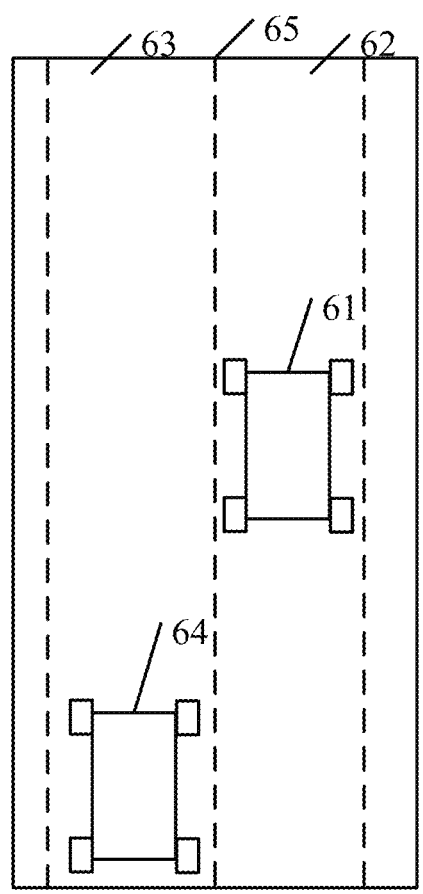
FIG. 6 illustrates a display interface of a three-dimensional visualization image when a movable platform is in a lane changing state according to some embodiments of the present disclosure.

FIG. 6 is taken as an example to illustrate a display viewing angle when the movable platform is in a lane changing state. FIG. 6 illustrates a display interface of a three-dimensional visualization image when the movable platform is in a lane changing state according to some embodiments of the present disclosure. As shown in FIG. 6, the movable platform is a vehicle 61, there are a current driving lane 62, and a left lane 63 on the left side of the current lane 62. The left lane 63 includes a vehicle 64. The display viewing angle of the three-dimensional visualization image is to display a three-dimensional visualization image of the left lane 63 in a second preset area 65 when the movable platform is determined to be in a left-lane changing state. The vehicle 64 is detected as an obstacle in the left lane 63 in the second preset area 65 and the distance between the vehicle 64 and the vehicle 61 (the movable platform) is determined to be, for example, 10 meters.

Thus, by displaying the three-dimensional visualization image of a lane for lane-changing in the second preset area including obstacles in the second preset area and obstacle distances from the rear of the movable platform when the movable platform is in the lane changing state, a user may be reminded of positions of the obstacles and the distances between the obstacles and the movable platform when changing lane. As such, the user can judge whether the distance between the obstacle and the movable platform is within a safe distance range, so as to avoid collision during the lane change, thereby improving safety of the movable platform in the lane changing state.

In some embodiments, the current motion state includes an accelerating state. When the interactive system determines a display viewing angle of the three-dimensional visualization image based on a current motion state, and it is determined that the movable platform is in the accelerating state, it can be determined that the display viewing angle of the three-dimensional visualization image is to display a three-dimensional visualization image within a third preset area distanced from the movable platform.

In one embodiment, when the interactive system determines whether the movable platform is in an accelerating state, it may determine that the movable platform is in the accelerating state based on an acquired touch operation of a user on an acceleration display icon among angle display icons in a touch control area of a display interface.

In other embodiments, the interactive system may determine whether the movable platform is in an accelerating state or a decelerating state based on acquired speed information of the movable platform.

Figure 7:
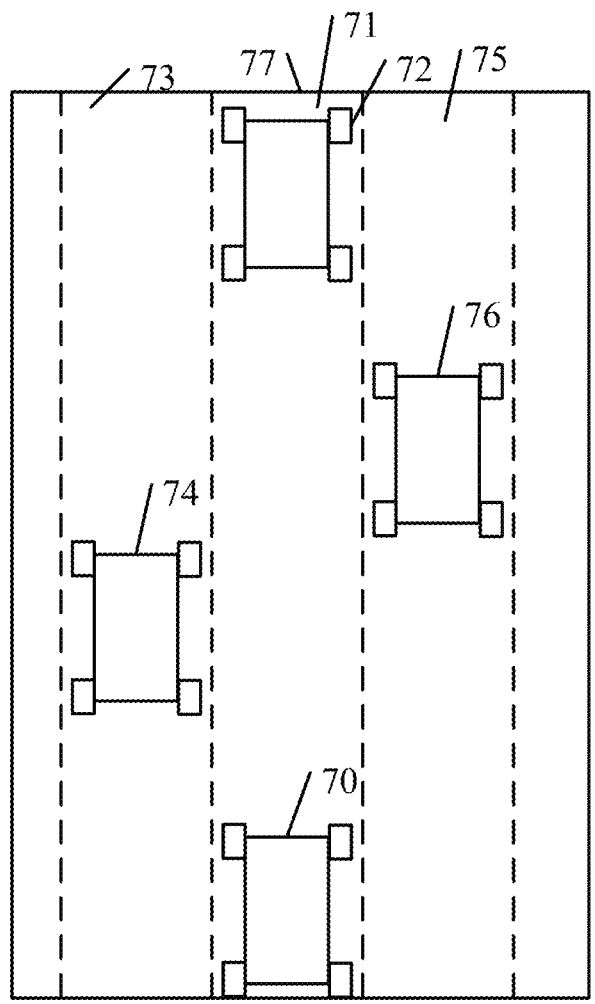
FIG. 7 illustrates a display interface of a three-dimensional visualization image when a movable platform is in an accelerating state according to some embodiments of the present disclosure.

FIG. 7 is taken as an example to illustrate a display viewing angle when the movable platform is in an accelerating state. FIG. 7 illustrates a display interface of a three-dimensional visualization image when the movable platform is in an accelerating state according to some embodiments of the present disclosure. As shown in FIG. 7, the movable platform is a vehicle 70, and the display viewing angle of the three-dimensional visualization image is to display a three-dimensional visualization image in front of the head of the vehicle 70 (i.e. the acceleration direction) in a third preset area 77. In the third preset area 77 of the acceleration direction, a current driving lane 71 including a vehicle 72, a left lane 73 including a vehicle 74, and a right lane 75 including a vehicle 76 are detected. The distance between the vehicle 72 and the vehicle 70 is, for example, 15 meters, the distance between the vehicle 74 and the vehicle 70 is, for example, 5 meters, and the distance between the vehicle 76 and the vehicle 70 is, for example, 10 meters.

Therefore, by displaying the surrounding environment information in the third preset area distanced from the head of the movable platform when the movable platform is in the accelerating state, and displaying the obstacles in the third preset area and the distances between the obstacles and the movable platform, a user may be reminded of positions of the obstacles and their positions from the head of the movable platform, when accelerating, to avoid colliding with the obstacles, thereby improving safety of the movable platform in the accelerating state.

Step S405 may include displaying the three-dimensional visualization image in a display area of a display interface based on the display viewing angle.

In some embodiments of the present disclosure, the interactive system may display the three-dimensional visualization image in a display area of a display interface based on the display viewing angle.

The interactive system disclosed in some embodiments of the present disclosure acquires a current motion state of the movable platform, determines a display viewing angle of a three-dimensional visualization image of the surrounding environment of the movable platform based on the current motion state, and displays the three-dimensional visualization image in a display area of a display interface based on the display viewing angle. Through this implementation manner, the display viewing angle of the three-dimensional visualization image may be automatically determined based on a motion state of the movable platform, which improves the display efficiency and flexibility of the three-dimensional visualization image.

Figure 8:
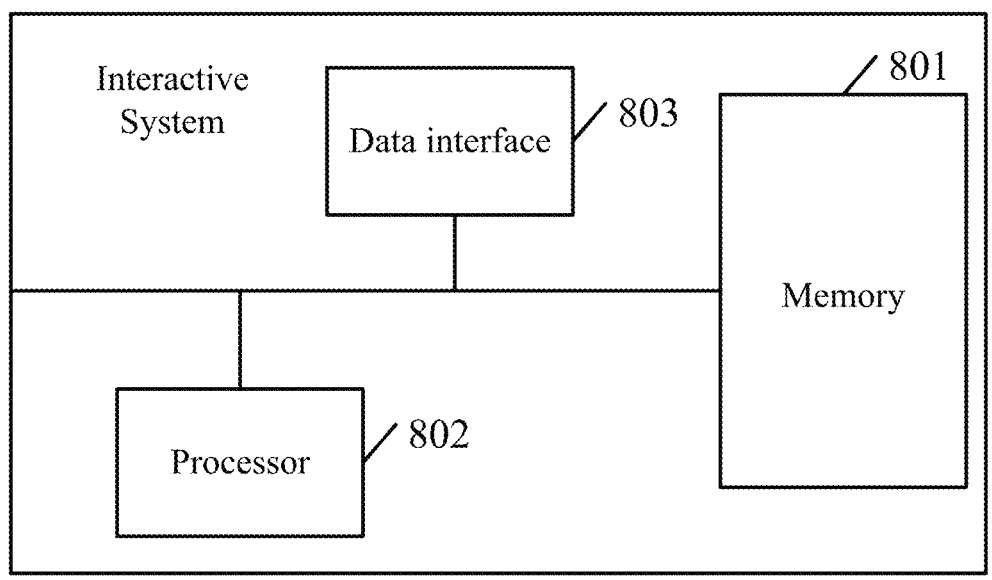
FIG. 8 illustrates a schematic structural diagram of an interactive system according to some embodiments of the present disclosure.

FIG. 8 illustrates a schematic structural diagram of an interactive system according to some embodiments of the present disclosure. The interactive system provided with a display interface is applied to a movable platform. The interactive system may include a memory 801, one or more processors or circuitry 802 and a data interface 803.

The memory 801 may include a volatile memory, a non-volatile memory, or a combination thereof. The processor 802 may be a central processing unit (CPU). The processor 802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), or any combination thereof.

The one or more processors 802 may be configured to call program instructions, and when the program instructions are executed by the one or more processors 802, the one or more processors 802 are configured to:
project three-dimensional point cloud data collected by a sensor to image data collected by a camera for fusion processing to obtain a fused image;
render the fused image to determine a three-dimensional visualization image of a surrounding environment where the movable platform is located; and
output the three-dimensional visualization image of the surrounding environment where the movable platform is located on the display interface.

In some embodiments of the present disclosure, the display interface may include a display area. When the one or more processors 802 are configured to output the three-dimensional visualization image of the surrounding environment where the movable platform is located on the display interface, the one or more processors 802 are configured to:
output the three-dimensional visualization image of the surrounding environment where the movable platform is located in the display area of the display interface.

In some embodiments of the present disclosure, the display interface may include a display area and a touch control area, and the touch control area may include a plurality of angle display icons and a plurality of sensor type icons. When the one or more processors 802 are configured to output the three-dimensional visualization image of the surrounding environment where the movable platform is located in the display area of the display interface, the one or more processors 802 are further configured to:
acquire a touch operation of a user on at least one of the plurality of angle display icons and/or at least one of the plurality of sensor type icons in the touch control area; and
generate an angle display instruction corresponding to the touch operation based on the touch operation, and display the three-dimensional visualization image in the display area of the display interface based on a display viewing angle indicated by the angle display instruction.

In some embodiments of the present disclosure, the touch operation may include at least one of a click operation, a slide operation, and a drag operation.

In some embodiments of the present disclosure, when the one or more processors 802 are configured to output the three-dimensional visualization image of the surrounding environment where the movable platform is located on the display interface, the one or more processors 802 are further configured to:
acquire a current motion state of the movable platform;
determine a display viewing angle of the three-dimensional visualization image based on the current motion state; and
display the three-dimensional visualization image in the display area of the display interface based on the display viewing angle.

In some embodiments of the present disclosure, the current motion state may include a reversing state. When the one or more processors 802 are configured to determine a display viewing angle of the three-dimensional visualization image based on the current motion state, the one or more processors 802 are configured to:
when it is determined that the movable platform is in the reversing state, determine that the display viewing angle of the three-dimensional visualization image is to display a three-dimensional visualization image within a first preset area distanced from a rear of the movable platform.

In some embodiments of the present disclosure, the current motion state may include a lane changing state. When the one or more processors 802 are configured to determine a display viewing angle of the three-dimensional visualization image based on the current motion state, the one or more processors 802 are configured to:
  when it is determined that the movable platform is in the lane changing state, determine that the display viewing angle of the three-dimensional visualization image is to display a three-dimensional visualization image of a lane for lane changing in a second preset area.

In some embodiments of the present disclosure, the current motion state may include an accelerating state. When the one or more processors 802 are configured to determine a display viewing angle of the three-dimensional visualization image based on the current motion state, the one or more processors 802 are configured to:
  when it is determined that the movable platform is in the accelerating state, determine that the display viewing angle of the three-dimensional visualization image is to display a three-dimensional visualization image within a third preset area distanced from a head of the movable platform.

In some embodiments of the present disclosure, the current motion state may include one or more of a reversing state, a lane changing state, a braking state, an accelerating state, and a decelerating state.

In some embodiments of the present disclosure, before the one or more processors 802 are configured to project three-dimensional point cloud data collected by a sensor to image data collected by a camera for fusion processing to obtain a fused image, the one or more processors 802 are further configured to:
  acquire a touch operation of a user on at least one of the plurality of sensor type icons in the touch control area; and
  determine a target sensor corresponding to the at least one of the plurality of sensor type icons selected by the touch operation, and acquire the three-dimensional point cloud data collected by the target sensor.

In some embodiments of the present disclosure, when the one or more processors 802 are configured to project three-dimensional point cloud data collected by a sensor to image data collected by a camera for fusion processing to obtain a fused image, the one or more processors 802 are further configured to:
  determine a coordinate transformation relationship between the image data and the three-dimensional point cloud data;
  based on the coordinate transformation relationship, transform point cloud data corresponding to the image data and the three-dimensional point cloud data into the same coordinate system; and
  project the three-dimensional point cloud data transformed into the same coordinate system into the image data for fusion processing to obtain the fused image.

In some embodiments of the present disclosure, when the one or more processors 802 are configured to render the fused image to determine a three-dimensional visualization image of a surrounding environment where the movable platform is located, the one or more processors 802 are further configured to:
  project the fused image onto a two-dimensional plane to obtain at least one projection image;
  determine obstacle information of the surrounding environment where the movable platform is located based on the at least one projection image; and
  determine the three-dimensional visualization image based on the obstacle information.

In some embodiments of the present disclosure, the obstacle information may include one or more of position information, size information, and distance information of an obstacle.

In some embodiments of the present disclosure, the obstacle may include one or more of pedestrians, vehicles, animals, and plants.

In some embodiments of the present disclosure, the sensor may include one or more of an image sensor, a laser radar, a millimeter wave radar, and an ultrasonic radar.

The data interface 803 may allow for input and output of data with other components, such as sensors, that may be connected to the devices/systems disclosed herein to facilitate the data communication of the devices/systems. The data interface may use an industry standard connection, such as RS-232, RS-422, RS-485, JO-link, ethernet, Wi-Fi, Bluetooth, Universal Serial Bus (USB), wired connections etc., to connect to desired components.

The interactive system disclosed in some embodiments of the present disclosure may project three-dimensional point cloud data collected by a sensor to image data collected by a camera for fusion processing to obtain a fused image, render the fused image to determine a three-dimensional visualization image of a surrounding environment where the movable platform is located, and output the three-dimensional visualization image of the surrounding environment where the movable platform is located on a display interface. As such, the safety during the movement of the movable platform is improved.

Some embodiments of the present disclosure further provide a movable platform. The movable platform may include: a body; a power system provided on the body to provide mobile power for the movable platform; and a processor configured to: project three-dimensional point cloud data collected by a sensor into image data collected by a camera for fusion processing to obtain a fused image; render the fused image to determine a three-dimensional visualization image of a surrounding environment where the movable platform is located; and output the three-dimensional visualization image of the surrounding environment where the movable platform is located on a display interface.

In some embodiments of the present disclosure, the display interface may include a display area. When the processor is configured to output the three-dimensional visualization image of the surrounding environment where the movable platform is located on the display interface, the processor is configured to:
  output the three-dimensional visualization image of the surrounding environment where the movable platform is located in the display area of the display interface.

In some embodiments of the present disclosure, the display interface may include a display area and a touch control area, the touch control area may include a plurality of angle display icons and a plurality of sensor type icons. When the processor is configured to output the three-dimensional visualization image of the surrounding environment where the movable platform is located in the display area of the display interface, the processor is configured to:
  acquire a touch operation of a user on at least one of the plurality of angle display icons and/or at least one of the plurality of sensor type icons in the touch control area; and
  generate an angle display instruction corresponding to the touch operation based on the touch operation, and display the three-dimensional visualization image in the display area of the display interface based on a display viewing angle indicated by the angle display instruction.

In some embodiments of the present disclosure, the touch operation may include at least one of a click operation, a slide operation, and a drag operation.

In some embodiments of the present disclosure, when the processor is configured to output the three-dimensional visualization image of the surrounding environment where the movable platform is located on the display interface, the processor is configured to:
  acquire a current motion state of the movable platform;
  determine a display viewing angle of the three-dimensional visualization image based on the current motion state; and
  display the three-dimensional visualization image in the display area of the display interface based on the display viewing angle.

In some embodiments of the present disclosure, the current motion state may include a reversing state. When the processor is configured to determine a display viewing angle of the three-dimensional visualization image based on the current motion state, the processor is configured to:
  when it is determined that the movable platform is in the reversing state, determine that the display viewing angle of the three-dimensional visualization image is to display a three-dimensional visualization image within a first preset area distanced from a rear of the movable platform.

In some embodiments of the present disclosure, the current motion state may include a lane changing state. When the processor is configured to determine a display viewing angle of the three-dimensional visualization image based on the current motion state, the processor is configured to:
  when it is determined that the movable platform is in the lane changing state, determine that the display viewing angle of the three-dimensional visualization image is to display a three-dimensional visualization image of a lane for lane changing in a second preset area.

In some embodiments of the present disclosure, the current motion state may include an accelerating state. When the processor is configured to determine a display viewing angle of the three-dimensional visualization image based on the current motion state, the processor is configured to:
  when it is determined that the movable platform is in the accelerating state, determine that the display viewing angle of the three-dimensional visualization image is to display a three-dimensional visualization image within a third preset area distanced from a head of the movable platform.

In some embodiments of the present disclosure, the current motion state may include one or more of a reversing state, a lane changing state, a braking state, an accelerating state, and a decelerating state.

In some embodiments of the present disclosure, before the processor is configured to project three-dimensional point cloud data collected by a sensor to image data collected by a camera for fusion processing to obtain a fused image, the processor is further configured to:
  acquire a touch operation of a user on at least one of the plurality of sensor type icons in the touch control area; and
  determine a target sensor corresponding to the at least one of the plurality of sensor type icons selected by the touch operation, and acquire three-dimensional point cloud data collected by the target sensor.

In some embodiments of the present disclosure, when the processor is configured to project three-dimensional point cloud data collected by a sensor into image data collected by a camera for fusion processing to obtain a fused image, the processor is configured to:
  determine a coordinate transformation relationship between the image data and the three-dimensional point cloud data;
  based on the coordinate transformation relationship, transform point cloud data corresponding to the image data and the three-dimensional point cloud data into the same coordinate system; and
  project the three-dimensional point cloud data transformed into the same coordinate system into the image data for fusion processing to obtain the fused image.

In some embodiments of the present disclosure, when the processor is configured to render the fused image to determine a three-dimensional visualization image of a surrounding environment where the movable platform is located, the processor is configured to:
  project the fused image onto a two-dimensional plane to obtain at least one projection image;
  determine obstacle information of the surrounding environment where the movable platform is located based on the at least one projected image; and
  determine the three-dimensional visualization image based on the obstacle information.

In some embodiments of the present disclosure, the obstacle information may include one or more of position information, size information, and distance information of an obstacle.

In some embodiments of the present disclosure, the obstacle may include one or more of pedestrians, vehicles, animals, and plants.

In some embodiments of the present disclosure, the sensor may include one or more of an image sensor, a laser radar, a millimeter wave radar, and an ultrasonic radar.

The movable platform disclosed in the present disclosure projects three-dimensional point cloud data collected by a sensor into image data collected by a camera for fusion processing to obtain a fused image, renders the fused image to determine a three-dimensional visualization image of a surrounding environment where the movable platform is located, so as to output the three-dimensional visualization image of the surrounding environment where the movable platform is located on a display interface. As such, the safety during the movement of the movable platform is improved.

One embodiment of the present disclosure also provides a computer-readable storage medium. The computer-readable storage medium has a computer program stored thereon, and when the computer program is executed by a processor, the interactive methods described in the present disclosure are implemented. The computer-readable storage medium having the computer program stored thereon may also be provided to the interactive devices or systems disclosed in the present disclosure. The more detailed description may be referred to the description disclosed above, which will not be repeated herein for conciseness.

The computer-readable storage medium may be an internal storage unit of the devices/systems described in any of the preceding embodiments, such as a hard disk or memory of the devices/systems. The computer-readable storage medium may also be an external storage device of the devices/systems, such as a plug-in hard disk equipped on the devices/systems, a smart memory card (Smart Media Card, SMC), or a Secure Digital (SD) card, Flash Card, etc. Further, the computer-readable storage medium may also include both an internal storage unit of the devices/systems and an external storage device. The computer-readable storage medium is used to store the computer program and other programs and data required by the devices/systems. The computer-readable storage medium can also be used to temporarily store data that has been output or will be output.

The computer readable storage medium may be a tangible device that can store programs and instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, devices, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the devices/systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

The processor may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

The memory and non-volatile storage medium may be computer-readable storage media. The memory may include any suitable volatile storage devices such as dynamic random-access memory (DRAM) and static random-access memory (SRAM). The non-volatile storage medium may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

The program may be a collection of machine-readable instructions and/or data that is stored in non-volatile storage medium and is used to create, manage and control certain software functions that are discussed in detail elsewhere in the present disclosure and illustrated in the drawings. In some embodiments, the memory may be considerably faster than the non-volatile storage medium. In such embodiments, the program may be transferred from the non-volatile storage medium to the memory prior to execution by a processor.

Those skilled in the art will appreciate that all or parts of the steps disclosed in the methods, devices and systems of the disclosure may be implemented by instructing the relevant hardware through a program, and the program may be stored in a computer-readable storage medium. When the program is executed, it includes one or a combination of the steps of the method embodiments disclosed herein.

It should be noted that certain terms are used in the description and claims to refer to specific components. As one skilled in the art will appreciate, a hardware manufacturer may refer to a component by different names. The present disclosure does not intend to distinguish between components that differ in name but not function. As used in the present disclosure and appended claims, the terms such as "comprise," "include," or "has/have" or any other variants thereof is an open term, they should be interpreted as "include but not limited to". The singular forms "a," "an," and "the" are intended to include the plural forms as well, unless the context clearly indicates otherwise. Relational terms such as "first," "second," "third" etc. are used herein merely to distinguish one entity or operation from another entity or operation without necessarily requiring or implying any such actual relationship or order between such entities or operations. The embodiments disclosed in the present disclosure are exemplary for description of the general principles of the present disclosure, and are not intended to limit the scope of the present disclosure. The protection scope of the present disclosure shall be subject to those defined by the appended claims.

It should be noted that when a component is referred to as being "fixed to" another component, it may be directly on the other component or intervening components may also be present. When a component is considered to be "connected" to another component, it may be directly connected to the other component or intervening components may be present at the same time. When an element is considered to be "electrically connected" to another element, it can be a contact connection, for example, a wire connection, or a non-contact connection, for example, a non-contact coupling, which may be an indirect coupling or a communication connection through some interfaces, devices or units. Unless otherwise defined, all technical and scientific terms used herein have the same meaning as commonly understood by those skilled in the technical field of the present disclosure. The terminology used herein in the description of the present disclosure is only for the purpose of describing specific embodiments, and is not intended to limit the present disclosure. The term "and/or" as used herein includes any and all combinations of one or more related listed items.

It should be understood that the disclosed devices/systems and methods may be implemented in other ways. For example, the embodiments disclosed above are only illustrative. For example, the division of the components and steps is only a logical function division, and there may be other divisions in an actual implementation, for example, multiple steps or components may be combined or they may be integrated into another system, or some features, steps or components may be omitted or not implemented.

Finally, it should be noted that the above embodiments/examples are only used to illustrate the technical features of the present disclosure, not to limit them; although the present disclosure has been described in detail with reference to the foregoing embodiments and examples, those of ordinary skill in the art should understand that: the technical features disclosed in the foregoing embodiments and examples can still be modified, some or all of the technical features can be equivalently replaced, but, these modifications or replacements do not deviate from the spirit and scope of the disclosure.

What is claimed is:

1. An interactive method for a movable platform, the interactive method comprising:
   projecting three-dimensional point cloud data collected by a sensor provided on the movable platform into image data collected by a camera provided on the movable platform for fusion processing to obtain a fused image data;
   rendering the fused image data to determine a three-dimensional visualization image of a surrounding environment where the movable platform is located, wherein the three-dimensional visualization image includes a visualization of an obstacle distanced from the movable platform in the surrounding environment; and
   outputting the three-dimensional visualization image of the obstacle distanced from the movable platform in the surrounding environment where the movable platform is located to display the three-dimensional visualization image on a display interface,
   wherein the projecting three-dimensional point cloud data collected by the sensor provided on the movable platform into image data collected by the camera provided on the movable platform for fusion processing to obtain the fused image data comprises:
   determining a coordinate transformation relationship between the image data and the three-dimensional point cloud data;
   based on the coordinate transformation relationship, transforming the image data and the three-dimensional point cloud data into a same coordinate system; and
   project the three-dimensional point cloud data transformed into the same coordinate system into the image data for fusion processing to obtain the fused image.

2. The interactive method of claim 1, wherein the display interface comprises a display area; and the outputting the three-dimensional visualization image of the surrounding environment where the movable platform is located on the display interface comprises:
   outputting the three-dimensional visualization image of the surrounding environment where the movable platform is located in the display area of the display interface.

3. The interactive method of claim 2, wherein the display interface further comprises a touch control area, and the touch control area comprises a plurality of angle display icons and a plurality of sensor type icons; and the outputting the three-dimensional visualization image of the surrounding environment where the movable platform is located in the display area of the display interface comprises:
   acquiring a touch operation of a user on at least one of the plurality of angle display icons and/or at least one of the plurality of sensor type icons in the touch control area; and
   generating an angle display instruction corresponding to the touch operation based on the touch operation, and displaying the three-dimensional visualization image in the display area of the display interface based on a display viewing angle indicated by the angle display instruction.

4. The interactive method of claim 1, wherein the outputting the three-dimensional visualization image of the surrounding environment where the movable platform is located on the display interface further comprises:
   acquiring a current motion state of the movable platform;
   determining a display viewing angle of the three-dimensional visualization image based on the current motion state; and displaying the three-dimensional visualization image in a display area of the display interface based on the display viewing angle.

5. An interactive system for a movable platform, comprising a display interface and one or more processors, collectively or individually, configured to:
project three-dimensional point cloud data collected by a sensor provided on the movable platform into image data collected by a camera provided on the movable platform for fusion processing to obtain a fused image data;
render the fused image data to determine a three-dimensional visualization image of a surrounding environment where the movable platform is located, wherein the three-dimensional visualization image includes a visualization of an obstacle distanced from the movable platform in the surrounding environment; and
output the three-dimensional visualization image of the obstacle distanced from the movable platform in the surrounding environment where the movable platform is located to display the three-dimensional visualization image on a display interface,
wherein when the one or more processors are configured to project the three-dimensional point cloud data collected by the sensor to the image data collected by the camera for fusion processing to obtain the fused image, the one or more processors are further configured to:
determine a coordinate transformation relationship between the image data and the three-dimensional point cloud data;
based on the coordinate transformation relationship, transform the image data and the three-dimensional point cloud data into a same coordinate system; and
project the three-dimensional point cloud data transformed into the same coordinate system into the image data for fusion processing to obtain the fused image.

6. The interactive system of claim 5, wherein the display interface comprises a display area; and when the one or more processors are configured to output the three-dimensional visualization image of the surrounding environment where the movable platform is located on the display interface, the one or more processors are configured to:
output the three-dimensional visualization image of the surrounding environment where the movable platform is located in the display area of the display interface.

7. The interactive system of claim 6, wherein the display interface further comprises a touch control area, and the touch control area comprises a plurality of angle display icons and a plurality of sensor type icons; and when the one or more processors are configured to output the three-dimensional visualization image of the surrounding environment where the movable platform is located in the display area of the display interface, the one or more processors are configured to:
acquire a touch operation of a user on at least one of the plurality of angle display icons and/or at least one of the plurality of sensor type icons in the touch control area; and
generate an angle display instruction corresponding to the touch operation based on the touch operation, and display the three-dimensional visualization image in the display area of the display interface based on a display viewing angle indicated by the angle display instruction.

8. The interactive system of claim 5, wherein when the one or more processors are configured to output the three-dimensional visualization image of the surrounding environment where the movable platform is located on the display interface, the one or more processors are further configured to:
acquire a current motion state of the movable platform,
determine a display viewing angle of the three-dimensional visualization image based on the current motion state; and
display the three-dimensional visualization image in a display area of the display interface based on the display viewing angle.

9. The interactive system of claim 8, wherein the current motion state of the movable platform is at least one of a reversing state, a lane changing state, or an accelerating state,
when the current motion state of the movable platform is in the reversing state, the display viewing angle of the three-dimensional visualization image is determined to display a three-dimensional visualization image within a first preset area distanced from a rear of the movable platform;
when the current motion state of the movable platform is in the lane changing state, the display viewing angle of the three-dimensional visualization image is determined to display a three-dimensional visualization image within a second preset area including a lane to which the movable platform is changed; and/or
when the current motion state of the movable platform is in the accelerating state, the display viewing angle of the three-dimensional visualization image is determined to display a three-dimensional visualization image within a third preset area distanced from a head of the movable platform.

10. The interactive system of claim 7, wherein before the one or more processors are configured to project the three-dimensional point cloud data collected by the sensor to the image data collected by the camera for fusion processing to obtain the fused image, the one or more processors are further configured to:
acquire a touch operation of a user on at least one of the plurality of sensor type icons in the touch control area; and
determine a target sensor corresponding to the at least one of the plurality of sensor type icons selected by the touch operation, and acquire the three-dimensional point cloud data collected by the target sensor.

11. The interactive system of claim 5, wherein when the one or more processors are configured to render the fused image to determine the three-dimensional visualization image of the surrounding environment where the movable platform is located, the one or more processors are configured to:
project the fused image onto a two-dimensional plane to obtain at least one projection image;
determine obstacle information of the surrounding environment where the movable platform is located based on the at least one projection image; and
determine the three-dimensional visualization image based on the obstacle information.

12. A movable platform, comprising:
a body;
a power system provided on the body to provide mobile power for the movable platform; and
a processor configured to:
project three-dimensional point cloud data collected by a sensor provided on the movable platform into image data collected by a camera provided on the movable platform for fusion processing to obtain a fused image data;

render the fused image data to determine a three-dimensional visualization image of a surrounding environment where the movable platform is located, wherein the three-dimensional visualization image includes a visualization of an obstacle distanced from the movable platform in the surrounding environment; and output the three-dimensional visualization image of the obstacle distanced from the movable platform in the surrounding environment where the movable platform is located to display the three-dimensional visualization image on a display interface, wherein when the processor is configured to project the three-dimensional point cloud data collected by the sensor to the image data collected by the camera for fusion processing to obtain the fused image, the processor is configured to:

determine a coordinate transformation relationship between the image data and the three-dimensional point cloud data;

based on the coordinate transformation relationship, transform the image data and the three-dimensional point cloud data into a same coordinate system; and project the three-dimensional point cloud data transformed into the same coordinate system into the image data for fusion processing to obtain the fused image.

13. The movable platform of claim 12, wherein the display interface comprises a display area; and when the processor is configured to output the three-dimensional visualization image of the surrounding environment where the movable platform is located on the display interface, the processor is configured to:

output the three-dimensional visualization image of the surrounding environment where the movable platform is located in the display area of the display interface.

14. The movable platform of claim 13, wherein the display interface further comprises a touch control area, and the touch control area comprises a plurality of angle display icons and a plurality of sensor type icons; and when the processor is configured to output the three-dimensional visualization image of the surrounding environment where the movable platform is located in the display area of the display interface, the processor is configured to:

acquire a touch operation of a user on at least one of the plurality of angle display icons and/or at least one of the plurality of sensor type icons in the touch control area; and generate an angle display instruction corresponding to the touch operation based on the touch operation, and display the three-dimensional visualization image in the display area of the display interface based on a display viewing angle indicated by the angle display instruction.

15. The movable platform of claim 12, wherein when the processor is configured to output the three-dimensional visualization image of the surrounding environment where the movable platform is located on the display interface, the processor is further configured to:

acquire a current motion state of the movable platform;

determine a display viewing angle of the three-dimensional visualization image based on the current motion state; and display the three-dimensional visualization image in a display area of the display interface based on the display viewing angle.

16. The movable platform of claim 15, wherein the current motion state of the movable platform is at least one of a reversing state, a lane changing state, or an accelerating state, when the current motion state of the movable platform is in the reversing state, the display viewing angle of the three-dimensional visualization image is determined to display a three-dimensional visualization image within a first preset area distanced from a rear of the movable platform;

when the current motion state of the movable platform is in the lane changing state, the display viewing angle of the three-dimensional visualization image is determined to display a three-dimensional visualization image within a second preset area including a lane to which the movable platform is changed; and/or when the current motion state of the movable platform is in the accelerating state, the display viewing angle of the three-dimensional visualization image is determined to display a three-dimensional visualization image within a third preset area distanced from a head of the movable platform.

17. The movable platform of claim 14, wherein before the processor is configured to project the three-dimensional point cloud data collected by the sensor to the image data collected by the camera for fusion processing to obtain the fused image, the processor is further configured to:

acquire a touch operation of a user on at least one of the plurality of sensor type icons in the touch control area; and determine a target sensor corresponding to the at least one of the plurality of sensor type icons selected by the touch operation, and acquire the three-dimensional point cloud data collected by the target sensor.

18. The movable platform of claim 12, wherein when the processor is configured to render the fused image to determine the three-dimensional visualization image of the surrounding environment where the movable platform is located, the processor is configured to:

project the fused image onto a two-dimensional plane to obtain at least one projection image;

determine obstacle information of the surrounding environment where the movable platform is located based on the at least one projection image; and determine the three-dimensional visualization image based on the obstacle information.

* * * * *